March 25, 1969     A. F. JOHNSON     3,434,957
ALUMINUM REDUCTION CELL WITH ALUMINUM AND REFRACTORY
LAYERED BOTTOM CONSTRUCTION
Filed Feb. 18, 1966
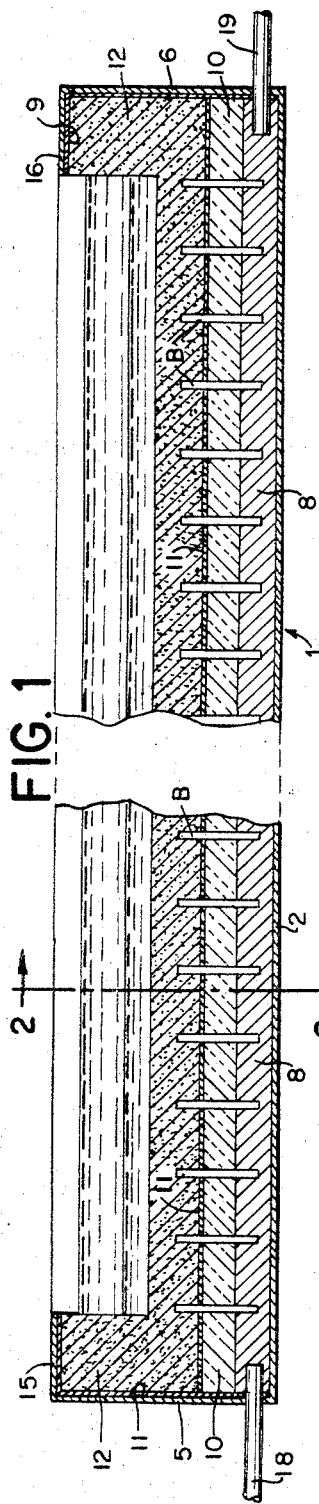
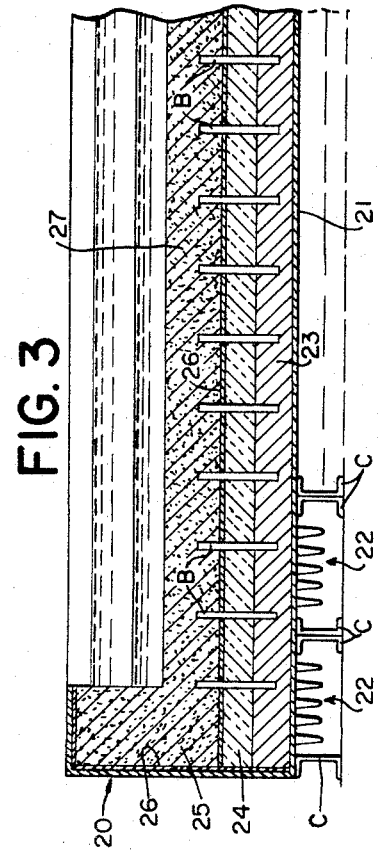
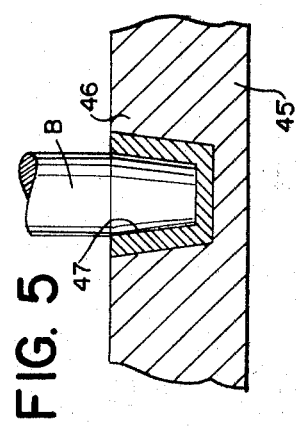
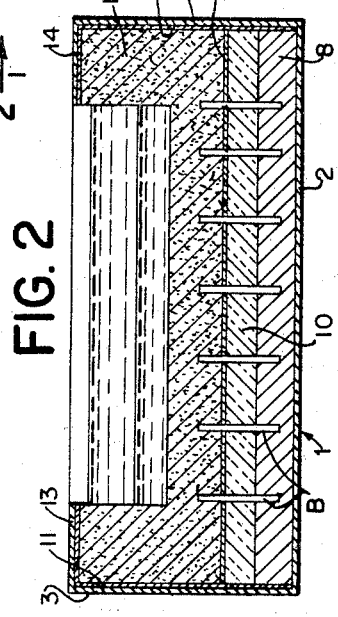
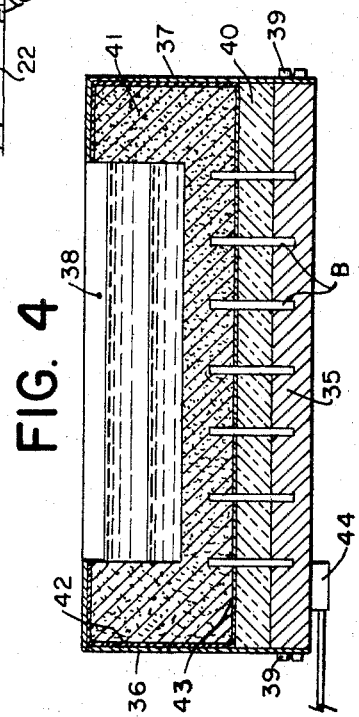
INVENTOR.
ARTHUR F. JOHNSON
BY Pennie, Edmonds
Morton, Taylor & Adams
ATTORNEYS

United States Patent Office 3,434,957
Patented Mar. 25, 1969

3,434,957
ALUMINUM REDUCTION CELL WITH ALUMINUM AND REFRACTORY LAYERED BOTTOM CONSTRUCTION
Arthur F. Johnson, Suite 22W, 5700 Arlington Ave., Riverdale, N.Y. 10471
Filed Feb. 18, 1966, Ser. No. 528,503
Int. Cl. C22d 1/08; B01k 3/02
U.S. Cl. 204—243                    15 Claims This invention relates to apparatus for the electrolytic reduction of fusions to produce aluminum at the cathode, and provides an improved cell, of which the Hall or Herault type are common examples, for the production of aluminum. Such cells have a metal shell, usually of steel or iron, a carbon lining or vessel which is the cathode, and anodes of carbon suspended in the fusion. Hereinafter, for convenience, the cathode vessel will be referred to as a carbon vessel with the understanding that "carbon" also means other carbonaceous cathode vessels.

Many different arrangements of contact elements or collector bars in the carbon lining connected to bars have been used and proposed for increasing the efficiency and uniformity of current flow from the carbon vessel and simplifying the arrangement of bus bars. This invention is concerned with the problem, and provides improvements in aluminum reduction cells which often have a metal shell with flat bottoms, relatively upright sides and ends and a carbon cathode vessel in which the fusion is reduced. This invention comprises an aluminum reduction cell having a slab of solid aluminum (or other suitably conductive metal) which may be over the bottom of the shell or actually be the bottom of the cell, a layer of thermal insulating refractory material over the slab of metal and under the bottom of the carbon vessel, and a multiplicity of iron or steel or cast iron or other metal or alloy collector bars in the aluminum sl b which extend vertically upwardly through the refractory layer and into the carbon cathode bottom. Hereinafter, for convenience, the slab will be referred to as aluminum; however, copper may also be used for the slab. The bars are electrical conductors carrying the current from the cathode bottom into the aluminum slab, and achieve the important result of carrying the currents vertically downward from a multiplicity of points in the carbon bottom into the aluminum slab below. Any bar carrying more than its share of current increases in heat and electrical resistance and tends to choke off the excess current flow. The aluminum slab may be formed advantageously by casting it over the shell bottom and placing the iron rods in the molten aluminum so that they become integral (in intimate bonded contact) with the slab after solidification. Alternately the iron rods may be made easily replaceable when relining the furnace by tapering or threading them to fit into copper thimbles or cups which are cast into the aluminum slab. The aluminum slab should be thick enough so that no appreciable electrical potential exists over its entire area between any two points therein so that there is no harmful tendency for currents to flow horizontally in the molten aluminum held in the carbon vessel. The aluminum slab may be uniformly flat or of variable thickness such as near the ends of the cell where the current is a maximum and is withdrawn. The preferred slab is of uniform thickness which will carry away local concentrations of either current or heat resulting. The aluminum slab may form the bottom of the cell in which case the sides and ends are bolted into tight contact with edges of the slab bottom.

In a preferred embodiment of the invention, a lining of refractory material which is electrically non-conducting and resistant to the solvent action of the molten cryolite is interposed between the shell and the carbon cathode vessel which preferably is also sandwiched between the cathode vessel bottom and the layer of refractory insulation over the aluminum slab. A very thin lining of similar refractory insulation or refractory paint may be interposed between the shell bottom and the slab of aluminum.

Any thin refractory material interposed between the aluminum slab and the shell bottom should have a minimum of thermal insulating effect as it is important to maintain the slab solid by cooling the bottom when necessary either by the normal dissipation of heat or by means of air circulated over the bottom. Suitable refractory paints such as sodium silicate paint or aluminum silicate paint in which fine ground silicon carbide is suspended may be used.

An important feature of the invention is the interposing of a relatively thick layer of refractory thermal insulation between the carbon bottom and the slab of aluminum to serve as a thermal barrier to the flow of heat into the aluminum slab and prevent it from melting. This layer may be from 2 inches to 8 inches or more in thickness. The thermal insulation should keep the aluminum slab below 500° F. and preferably 200° F. to 250° F. or less.

The steel or iron or other metal collector bars used in the cell of the invention are short because of their upright positions and thus have a relatively low electrical resistance. The preferred design of bar is from ½ inch to 2 inches of hot rolled steel covered in at least the length imbedded in the carbonaceous lining with a ¼ to 2 inch layer of graphitic cast iron with fluted grooves to make improved contact with the carbonaceous cathode. Graphite may be used instead of cast iron to protect the iron rods from molten aluminum reaching the rods due to cracks in the potlining.

A further advantage in the improved cell of the invention is that the molten aluminum which enters cracks which form from time to time in the carbon cathode vessel does not cause significant damage to the cell as a whole when the aluminum contacts an iron collector bar, particularly when the iron bar is covered with a shell of graphitic cast iron, but merely heats the bar, either greatly increasing its resistance to the flow of current or melting off the bar so that it ceases to be a conductor.

These and other novel features of the invention will be better understood after considering the following discussion and accompanying drawings in which:

FIG. 1 is a longitudinal vertical cross-section of an aluminum reduction cell of the invention;

FIG. 2 is a vertical sectional view at 2—2 of FIG. 1;

FIG. 3 is a vertical sectional view similar to FIG. 2 of a modification;

FIG. 4 is a vertical sectional view of another aluminum reduction cell of the invention, and FIG. 5 is a fragmentary sectional view showing a means of attaching the collector bars to the solid slab.

The embodiment of the invention illustrated in FIGS. 1 and 2 for the purpose of illustrating just one example is a so-called Hall type aluminum reduction cell comprising a steel shell 1 having a flat bottom 2, upright sides 3 and 4 and ends 5 and 6.

An aluminum slab 8 is applied directly over the bottom 2, preferably by pouring molten aluminum on the shell bottom, or the slab may be preformed and placed in the cell. Before the aluminum slab is cast in place on the bottom the steel or iron collector bars B are inserted into position and are supported in vertical positions and held till the aluminum freezes. Alternately externally flanged copper cups or thimbles are cast into the aluminum. Then threaded or tapered collector bars are fitted into the thimbles and may later be easily removed when the carbonaceous lining is replaced as shown in FIG. 5. After the slab is cast and bars in place a layer of thermal refractory insulation 10 formed of bricks, a castable refractory layer or powder, or combinations thereof, preferably consisting of alumina with or without a binder, is applied over the aluminum slab 8 and packed around the collector bars B. This layer of heat insulating refractory, in tight contact with the bars, is sufficiently thick that it is a thermal barrier greatly reducing the flow of heat into the aluminum slab 8 so that with the dissipation of heat from the bottom the slab remains solid. The refractory lining 11 may be any suitable thin layer or sheet such as silicon carbide preferably applied when cemented on a sheet of paper similar to sandpaper, or on a sheet such as "Transite" board. This layer or lining should be a refractory resistant to cryolite fusions. A similar lining of refractory material is applied to the sides and ends and is extended over the top of the carbon cathode vessel 12. The sides and ends of the shell 3, 4, and 5, 6 preferably have flanges 13, 14 and 15, 16 extending inward over the top of the cathode vessel. In addition to this thin refractory layer silicon carbide bricks of substantial thickness such as 2 inches or more may be used to insulate the sides of the steel vessel from the carbon lining. In any case the thin refractory which may also be a paint such as aluminum silicate is desirable in a continuous layer without joints next to the steel shell.

The carbon cathode vessel 12 is formed in the usual way by tamping into the shell 1 a mixture of partially graphitized coal, coke or graphite with a binder. It is preferred that the thin refractory lining material also be sandwiched between the cathode bottom and the heat insulating layer 10. This refractory material serves as a barrier to the flow of cryolite fusion and most importantly has dielectric properties which insulate the cathode vessel from the shell.

The bars may be formed of iron or cast iron from ½ inch to 3 inches in diameter, from 4 inches to 20 inches long and preferably extend into the slab 8 through its entire thickness. The preferred bar design is an iron rod about 1 inch in diameter covered at least where it contacts the carbon bottom with a fluted graphitic cast iron layer varying from ¾ inch to 1¼ inches thick. In a cell, for example, 3½ feet deep, 8 feet wide and 28 feet long the aluminum slab may be about 3 inches thick, the collector bars projecting about 14 inches above the aluminum slab and the refractory heat insulating layer 10 around 6 inches to 9 inches thick. I prefer to distribute uniformly over the carbon lining from about 500 to 800 rods in a cell of this large size. Alternately the rods may be confined to an area directly under the anodes although this will not usually be found necessary or desirable for best operation of the cell.

It will be apparent that this invention eliminates the usual complex arrangement of lateral bus bars and flexibles connecting these with the conventional horizontal iron collector bars and provides a very simple cathode connection to the power supply or next succeeding cell in the cathode vessel. To this end the cathode busses 18 and 19 which may be aluminum or copper are inserted through slots in the shell and are connected as by casting or welding to the aluminum slab 8. These busses may be connected to the next cell in a series or to the current generating source, or via rectifiers and transformers leading eventually to the electrical generator.

FIG. 3 illustrates a modification in which the cell shell 20 has a bottom 21 supported on the usual channel bars C which may be formed of steel. The bottom has projecting fins 22 for increasing the flow of heat from the bottom which may be arranged between the channel bars C. This additional cooling is especially effective when circulated cooling air is promoted by ample spaces for air under the cell and circulated between the channel bars. It will be noted that there is no electrical insulating refractory or paint between the shell 21 and the aluminum slab 23. This modified cell is otherwise like the cell of FIG. 1 and comprises collector bars B, a refractory layer 24 and a carbon cathode vessel 25. As in FIGS. 1 and 2, the lining of refractory material 26 is between the sides and ends of the shell and the cathode vessel and is sandwiched between the refractory layer 24 and the cathode bottom 27.

FIG. 4 illustrates a cell of the invention comprising an aluminum or copper bottom 35 which may be from 1 to 3 inches thick and the side walls 36 and 37 and the end walls (only wall 38 being shown) are secured with a liquid tight connection by means of several stud bolts 39. This aluminum or copper bottom may be a casting in which case the collector bars B are attached as in FIG. 5 and integral cooling fins as in FIG. 3 may be on the bottom if desired. A thick refractory layer 40 as in FIG. 1 is applied over the slab 35 and the bars B extend through the refractory layer and into the carbon cathode vessel 41. In this cell I may also use a refractory lining 42 between the cathode vessel and the ends and sides and also a layer of the same refractory 43 between the layer of refractory 40 and the aluminum slab or bottom 35. This cell has the advantage of more rapid cooling of the bottom than the cell of FIG. 1 and provides for an efficient control of magnetic flux density in the cell.

The cathode bus 44 is preferably a copper bar attached to the bottom 35 as with bolts and it may be located in a place which lowers the magnetic flux density in the cell.

FIG. 5 shows one means for attaching the collector bars B to the aluminum slab. In casting the aluminum slab a copper insert 46 is placed in the slab for each rod. This insert has a tapered hole 47 into which the tapered end of the rod B is pushed with a tight fit. This makes a good electrical connection and also makes it a simple matter to remove the rods for replacements during relining of the carbon vessel.

The improved electrolytic cell provides several advantages over the conventionally used aluminum reduction cells. The current travels uniformly down through the cell bottom and vertically into the slab of aluminum. Approximately four times as many collector bars can be used in this improved cell as are used in cells having horizontal collector bars and the vertical collector bars need be only about one-half the diameter. Each bar that is overloaded with current increases in resistance and chokes down the current flow. Thus 100,000 amperes of current in a cell may be kept flowing uniformly over the entire cell bottom. The only openings required in the shell having a steel bottom are the slots for the bus connectors and only two of these are required, at the ends, the center or at the corners. Since the slab of aluminum is cooled no pentration of the heat insulating refractory 10 will cause a cell failure because the molten fusion of cryolite and alumina will freeze when it reaches the proximity of the much cooler aluminum slab. Thus destructive "tap-outs" of flux and molten aluminum from the cell are prevented and cell life lining extended.

I claim:

1. The electrolytic cell for the reduction of aluminum comprising a metal shell having relatively upright sides, ends and a generally flat bottom, a slab of solid aluminum or copper at the bottom, a layer of refractory thermal insulation over the solid slab of such thickness that it is an effective heat barrier preventing the melting of the solid slab, a carbon cathode vessel in the cell having a bottom over the refractory layer, a plurality of upright steel or iron collector bars having their lower ends in electrical connection with the solid slab, their upper ends in the carbon bottom and being in intimate contact with the layer of refractory insulation, and a cathode bus connected to the solid slab.

2. The electrolytic cell of claim 1 which comprises fins on the shell bottom to facilitate removal of heat.

3. The electrolytic cell of claim 1 in which the solid slab is an aluminum casting which was poured into and solidified in the shell.

4. The electrolytic cell of claim 1 in which the solid slab is at least 1 inch thick and the refractory insulation is at least 2 inches thick.

5. The cell for the electrolytic reduction of aluminum from fusions of alumina which comprises a steel or iron shell having a subsantially flat bottom and upright sides and ends, a carbon cathode vessel having a bottom and sides for confining the fusion, a refractory lining of material which is highly resistant to cryolite fusions between the sides and ends of the shell and the carbon vessel, a slab of solid aluminum over the sheel bottom, a plurality of upright iron collector bars in electrical connection with the aluminum slab, a layer of refractory thermal insulation over the slab of aluminum and in intimate contact with the collector bars, a thin layer of refractory material which is highly resistant to cryolite fusions interposed between the bottom of the carbon cathode vessel and the layer of refractory thermal insulating material, the collector bars extending from the aluminum slab through the refractory layers and into the carbon bottom, and a cathode bus connected to the aluminum slab.

6. The electrolytic reduction cell of claim 5 in which the aluminum slab is at least 1 inch thick and is a casting applied directly on the shell bottom.

7. The electrolytic reduction cell of claim 5 which comprises means on the cell bottom to remove heat by circulating cooling air over the bottom to prevent overheating of the aluminum slab.

8. The electrolytic reduction cell of claim 5 in which the layer of thermal insulating refractory is at least 2 inches thick and suppresses the flow of heat into the aluminum slab.

9. The electrolytic cell for the reduction of aluminum which comprises a bottom formed of a solid slab of aluminum or copper upright metal sides and ends secured to the slab, a layer of refractory thermal insulating material over the slab, a carbon cathode vessel within the sides and ends having a bottom over the refractory layer, and a muliplicity of iron or steel collector rods in electrical connection with the solid slab extending upwardly through the refractory layer and into the bottom of the cathode vessel.

10. An electrolytic cell as defined in claim 9 which comprises a coating of refractory material between the cathode vessel bottom and the layer of refractory thermal insulating material.

11. The electrolytic cell of claim 9 in which at least some of the collector rods have a cross sectional area less than three square inches.

12. The cell of claim 9 in which the collector rods are made of rolled iron or steel and are covered with cast iron at least over their lengths making contact with the carbon vessel.

13. The cell of claim 9 in which the iron or steel rods are removable and replaceable from the aluminum slab during relining of the cell.

14. The cell of claim 9 in which the area of the collector rods passing through the refractory thermal insulating material is coated with an electrical and corrosion resistant material consisting essentially of aluminum silicate or silicon carbide.

15. The electrolytic cell for the reduction of aluminum having a steel shell and a carbon cathode vessel in the shell, which comprises a continuous painted coating adhered to the shell between the shell and the carbon vessel which is both an electrical insulator and resistant to molten cryolite and aluminum, said coating consisting essentially of aluminum silicate or sodium silicate with silicon carbide dispersed therein.

References Cited
UNITED STATES PATENTS

| | | | |
|---|---|---|---|
| 2,378,142 | 6/1945 | Hurter | 204—67 |
| 2,971,899 | 2/1961 | Hanink et al. | 204—243 XR |
| 3,161,579 | 12/1964 | Henry et al | 204—243 |
| 3,202,600 | 8/1965 | Ransley | 204—243 XR |
| 3,257,307 | 6/1966 | Henry et al. | 204—243 XR |
| 3,321,392 | 5/1967 | McMinn et al. | 204—243 |

JOHN H. MACK, *Primary Examiner.*

DONALD R. VALENTINE, *Assistant Examiner.*

U.S. Cl. X.R.

204—67